United States Patent
Meyer et al.

(10) Patent No.: US 9,895,947 B2
(45) Date of Patent: Feb. 20, 2018

(54) MULTIPIECE SPRING LINK

(71) Applicant: Benteler Automobiltechnik GmbH, Paderborn (DE)

(72) Inventors: Stephan Meyer, Bielefeld (DE); Oliver Mielke, Altenbeken (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 14/962,743

(22) Filed: Dec. 8, 2015

(65) Prior Publication Data
US 2016/0167472 A1   Jun. 16, 2016

(30) Foreign Application Priority Data
Dec. 12, 2014   (DE) .......................... 10 2014 118 518

(51) Int. Cl.
*B62D 21/02* (2006.01)
*B60G 7/00* (2006.01)
*B60G 11/16* (2006.01)

(52) U.S. Cl.
CPC ............. *B60G 7/001* (2013.01); *B60G 11/16* (2013.01); *B60G 2202/12* (2013.01); *B60G 2204/1244* (2013.01); *B60G 2204/422* (2013.01); *B60G 2206/10* (2013.01); *B60G 2206/7102* (2013.01); *B60G 2206/8103* (2013.01); *B60G 2206/8105* (2013.01)

(58) Field of Classification Search
CPC ................................ B60G 7/001; B60G 11/16
See application file for complete search history.

(56) References Cited

U.S. PATENT DOCUMENTS 2,017,316 A    10/1935   Leighton
2,179,856 A *  11/1939   Leighton .................. B60G 3/20
                                                  280/124.141
(Continued)

FOREIGN PATENT DOCUMENTS

CN        1318480 A       10/2001
DE    102004008957 A1      9/2005
(Continued)

OTHER PUBLICATIONS

Ingo Winter, Vehicle suspension arm for damper mounting has a pressed profile with bracing cross strips to prevent deformation of the arm, Sep. 1, 2005, German Patent Office, DE 10 2004 008 957 A1, Machine Translation of Description.*

(Continued)

*Primary Examiner* — James A English
(74) *Attorney, Agent, or Firm* — Mannava & Kang, P.C.; Arash Behravesh

(57) ABSTRACT

The invention concerns a multipiece spring link (100) for a wheel suspension of a vehicle, with: a first profiled side piece (101), forming a first side leg of the multipiece spring link (100), wherein the first profiled side piece (101) has a first bulge (105); a second profiled side piece (103), forming a second side leg of the multipiece spring link (100), wherein the second profiled side piece (103) has a second bulge (107); and wherein the first bulge (105) and the second bulge (107) are arranged one opposite the other and together form a spring receiving region (108) for the receiving of a spring.

16 Claims, 13 Drawing Sheets

(56) References Cited

U.S. PATENT DOCUMENTS

| | | | |
|---|---|---|---|
| 2,344,896 A | 3/1944 | Phelps | |
| 2,707,100 A | 4/1955 | Schilberg | |
| 2,731,257 A * | 1/1956 | Hansen | B60G 7/04 267/190 |
| 4,170,373 A * | 10/1979 | Beck | B60G 7/001 280/124.141 |
| 9,090,138 B2 * | 7/2015 | Haselhorst | |
| 2005/0184481 A1 * | 8/2005 | Tanaka | B60G 3/202 280/124.134 |
| 2006/0175788 A1 * | 8/2006 | Nuno | B60G 3/20 280/124.153 |
| 2012/0021241 A1 * | 1/2012 | Perry | B21D 53/88 428/594 |
| 2012/0299263 A1 * | 11/2012 | Mielke | B60G 7/001 280/124.134 |
| 2014/0300072 A1 * | 10/2014 | Willems | B60G 7/02 280/124.1 |
| 2014/0300074 A1 * | 10/2014 | Koormann | B60G 7/001 280/124.151 |
| 2015/0008654 A1 * | 1/2015 | Haselhorst | B60G 7/001 280/124.128 |
| 2015/0115561 A1 * | 4/2015 | Nakasato | B60G 7/001 280/124.151 |
| 2016/0280284 A1 * | 9/2016 | Scholz | B62D 35/02 |

FOREIGN PATENT DOCUMENTS

| | | | | |
|---|---|---|---|---|
| DE | 102006032595 A1 | 1/2008 | | |
| DE | 102008013182 A1 | 9/2009 | | |
| DE | 102008059916 B3 | 4/2010 | | |
| DE | 102010051741 A | 5/2012 | | |
| DE | 102010051741 A1 | 5/2012 | | |
| DE | 102013004352 A1 | 9/2014 | | |
| EP | 1364817 B1 | 6/2006 | | |
| EP | 2810799 A1 | 12/2014 | | |
| JP | WO 2013124972 A1 * | 8/2013 | | B60G 7/001 |
| KR | 20100137958 A | 12/2010 | | |
| NO | WO 2006046876 A1 * | 5/2006 | | B21D 53/88 |
| WO | 2006/046876 A1 | 5/2006 | | |

OTHER PUBLICATIONS

European Patent Office, International Search Report for EP 3031637, dated Apr. 29, 2016 (9 pages).

* cited by examiner

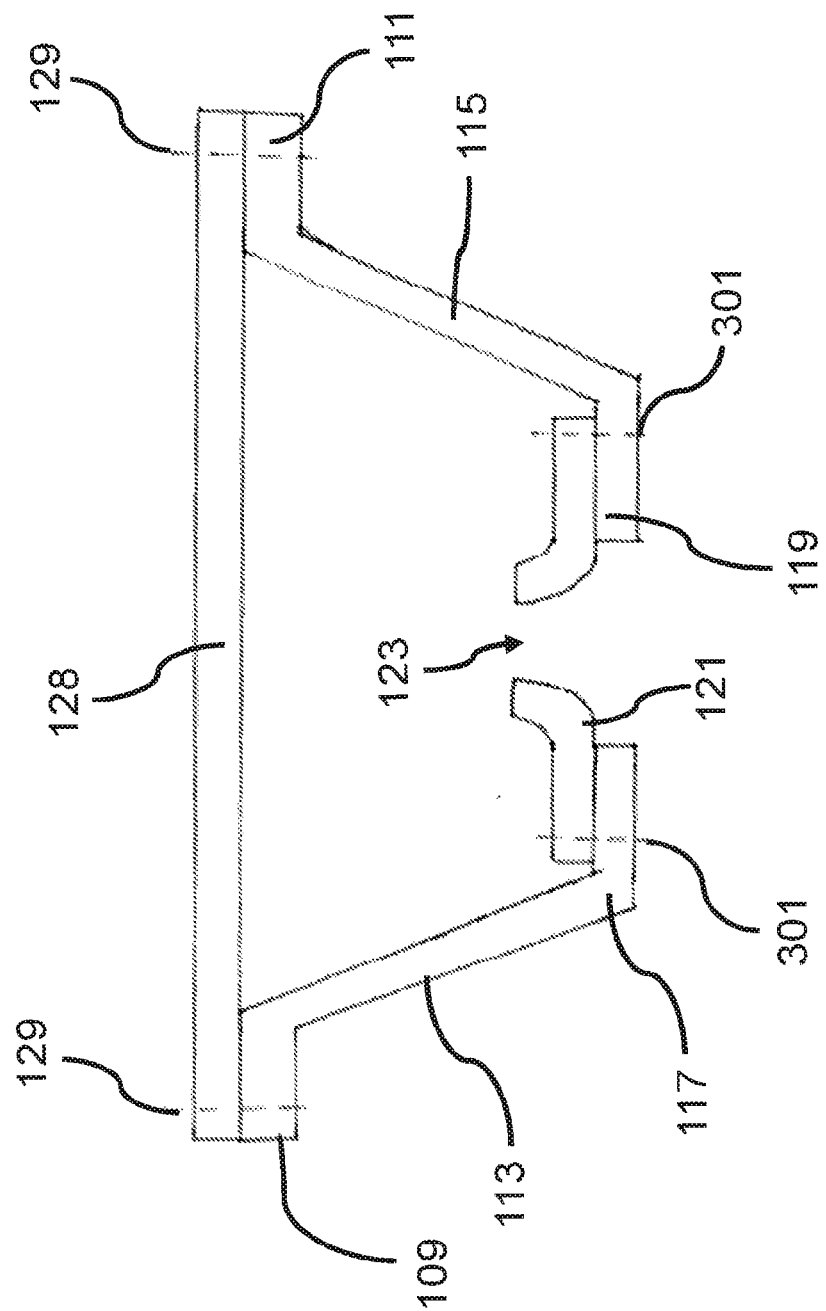

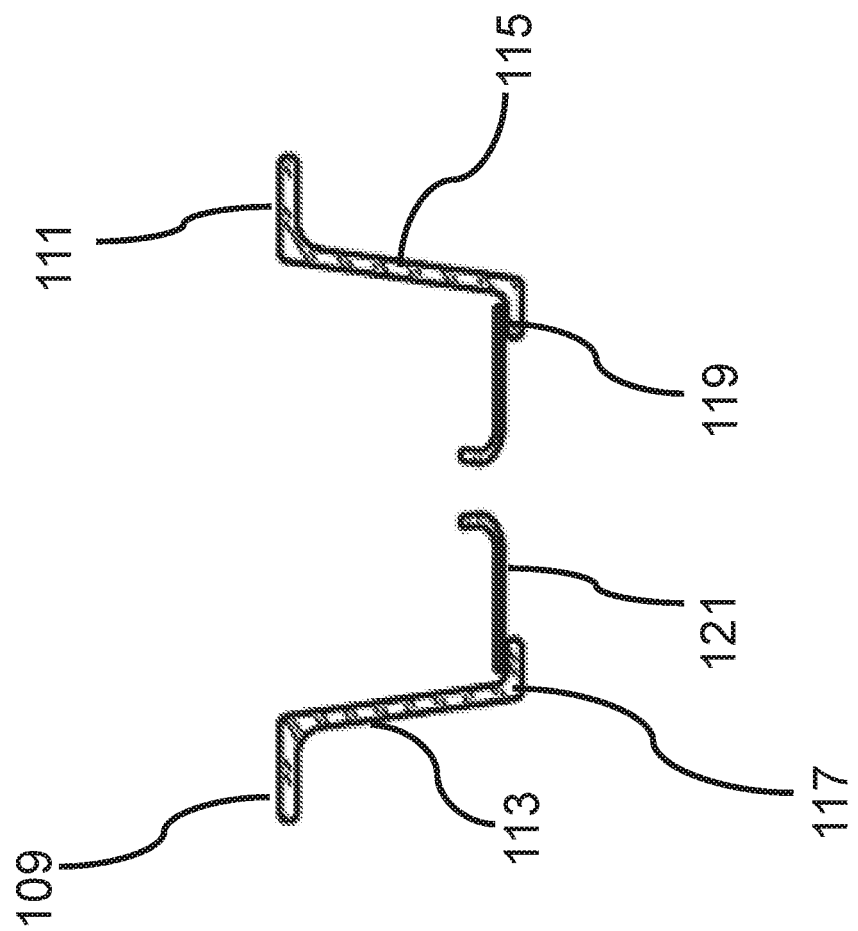

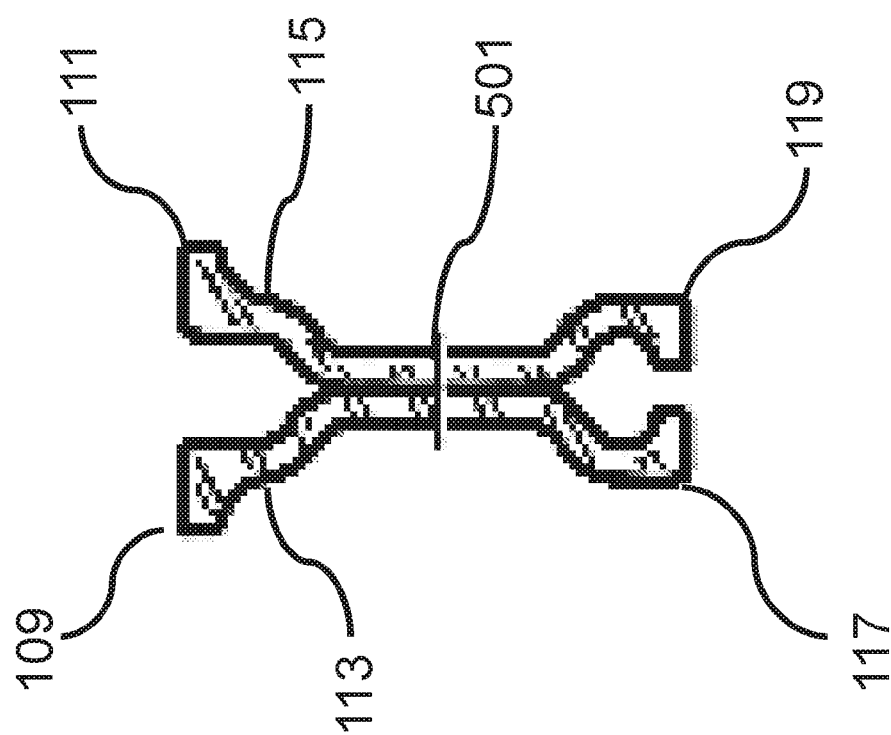

MULTIPIECE SPRING LINK

PRIORITY

The present application is claims priority to German patent application number 10 2014 118 518.8, having a filing date of Dec. 12, 2014, the disclosures of which are hereby incorporated by reference in their entireties.

TECHNICAL FIELD

The present invention concerns a spring link.

BACKGROUND

Spring links have the function in automotive engineering to guide a wheel in a wheel suspension in one direction or in several directions. Usually a spring link absorbs the forces acting on the wheel and passes these on to a spring coupled to the spring link and a rear axle beam, or on to a spring-damper system.

The known spring links are formed by spring link shells, having a spring support to receive the spring. The alternating loading of the damping forces can lead however to an unwanted widening of such a spring link shell. Furthermore, spring link shells are costly to manufacture.

DE102010051741 discloses a spring link made from a light metal extruded profile with a Pi-shaped cross section, which has a greater rigidity as compared to traditional spring links, which are formed by spring link shells. The light metal extruded profile can furthermore be formed economically by bending, punch cutting or spreading into a finished part.

SUMMARY OF THE INVENTION

The object of the present invention is to create an alternative concept for an economical spring link which can dispense with the need for a shell design.

The above object is achieved by the features of the independent claim. Advantageous embodiments of the invention are the subject matter of the dependent claims, the specification, and the figures.

The invention is based on the understanding that an economical spring link can be formed by two separate profiled side pieces arranged alongside each other, forming the two side legs of the spring link. In this way, one can dispense with the use of shells for the construction of the spring link. The rigidity of the profiled side pieces can be influenced by a profiling of the cross sections of the profiled side pieces, for example, by a Z profile. The spring receiving region for one spring can be formed economically by a bulge or widening of the profiled side pieces, for example, by bending of the profiled side pieces. Furthermore, reinforcing ribs or reinforcing webs can be provided in order to achieve even greater rigidity. The bulges can be formed by bends of the profiled side pieces.

According to one aspect, the invention concerns a multipiece spring link for a wheel suspension of a vehicle, with a first profiled side piece, forming a first side leg of the multipiece spring link, wherein the first profiled side piece has a first bulge, a second profiled side piece, forming a second side leg of the multipiece spring link, wherein the second profiled side piece has a second bulge, wherein the first bulge and the second bulge are arranged one opposite the other and together form a spring receiving region for the receiving of a spring.

The first profiled side piece and the second profiled side piece are preferably each formed of a light metal, such as aluminum, e.g., a 2000, 5000, 6000, or 7000 series alloy. The first profiled side piece and the second profiled side piece can each be extruded profiles. In this way, the profiled side pieces can be produced economically.

The first profiled side piece and the second profiled side piece are preferably formed identical, yet mirror images of each other, and thereby form a first, left, side leg and a second, right, side leg.

According to one embodiment, the profiled side pieces form only the side legs of the spring link. In other words, the profiled side pieces do not form a bottom, in particular, not any closed bottom, and no top, in particular, not any closed top of the spring link. The profiled side pieces can travel over the entire length of the spring link spaced apart from each other. However, the profiled side pieces can also be joined partly to each other by connections, such as clinch or rivet connections.

The profiled side pieces in themselves are likewise not formed by any shells. The cross section profiles of the profiled side pieces are therefore not shell-shaped, but open, such as Z shaped or S shaped.

According to one embodiment, the first profiled side piece and the second profiled side pieces are one-piece profiled side pieces, especially extruded profiled side pieces. The profiled side pieces can thus be produced economically in large lot sizes.

According to one embodiment, the first profiled side piece and the second profiled side piece are spaced apart from each other at least for a section and arranged opposite each other.

According to one embodiment, the walls of the two profiled side pieces are brought together and joined for a section.

According to one embodiment, the first profiled side piece and the second profiled side piece each have a Z shaped cross section, especially an elongated Z shaped, or an S shaped, especially an elongated S shaped cross section.

This achieves a good rigidity in the transverse direction to the longitudinal axis of the spring link.

According to one embodiment, the first profiled side piece and the second profiled side piece each have an outer flange and an inner flange, wherein in each case one outer flange and one inner flange of the respective profiled side piece is joined by a wall, wherein the outer flanges of the profiled side pieces are oriented outward facing away from each other and wherein the inner flanges of the profiled side pieces are oriented inward facing each other. With a Z shaped cross section, the outer flanges are formed by the upper Z webs of the mirror image Z profiles. The inner flanges are formed by the lower Z webs of the mirror image Z profiles. The walls in the case of an elongated, stretched apart Z profile can extend from the particular Z web at an angle greater than 90°.

According to one embodiment, the profile thicknesses of the outer flanges differ from the profile thicknesses of the inner flanges and/or from the profile thicknesses of the walls. The outer flanges can be thicker than the inner flanges and the walls. The profile or wall thickness of the profiled side pieces can be between 2-6 mm. The two flanges are preferably thicker than the thickness of the respective wall. In this way, a flexible adaptation of the spring link to different loading requirements is accomplished. The basic design of the spring link can remain the same. The different wall and profile thicknesses can be produced by extrusion.

According to one embodiment, the first profiled side piece and the second profiled side piece each have an inner flange, wherein the inner flanges of the profiled side pieces are directed inward and facing each other, while in the spring receiving region a spring support part is arranged on the inner flanges for supporting the spring. The spring support part spans a gap between the inner flanges and thereby forms a spring support for the spring.

According to one embodiment, the spring support part is formed by a molded part, especially by a light metal pressed part. In this way, the spring support part can be made separately and economically.

According to one embodiment, the spring support part is formed by a molded part, especially by a light metal pressed part, with a central opening and a centering web bordering the central opening for the centering of the spring.

According to one embodiment, the spring support part is joined to the respective inner flange by means of a cold joining technique, especially a clinch connection and/or a punch rivet connection and/or a glue connection, or by means of a warm joining technique, especially a welded connection or a friction stir welding.

According to one embodiment, the first profiled side piece and the second profiled side piece each have an outer flange, wherein the outer flanges of the profiled side pieces are outwardly directed and facing away from each other, while a reinforcing web is arranged on the outer flanges, which joins the first profiled side piece and the second profiled side piece.

According to one embodiment, the reinforcing web is joined to the respective outer flange by means of a cold joining technique, especially a clinch connection and/or a punch rivet connection and/or a glue connection, or by means of a warm joining technique, especially a friction stir welding.

According to one embodiment, a reinforcing web is provided, which passes through a wall of the first profiled side piece and a wall of the second profiled side piece and joins the first profiled side piece and the second profiled side piece.

According to one embodiment the respective reinforcing web is arranged at the wheel suspension side, immediately before or after the spring receiving region, or at the vehicle chassis side.

According to one embodiment, the first bulge and the second bulge extend transversely to an extension direction or to a longitudinal axis of the multipiece spring link or the respective profiled side piece. The bulges curve the profiled side pieces outward, i.e., pointing away from each other, and thereby jointly form a barrel-shaped spring receiving region.

According to one embodiment, the first bulge and the second bulge are U-shaped or at least for a section shaped as a circular arc. In this way, an at least partly round barrel-shaped spring receiving region is formed for the support of the spring.

According to one embodiment, the multipiece spring link has a first bearing end for mounting at the wheel side and a second bearing end for mounting at the vehicle chassis side, wherein the first profiled side piece and the second profiled side piece have aligned opposing bearing openings at the first bearing end, especially punched holes, for the damper connection and/or wherein aligned opposing bearing openings are formed in the first profiled side piece and in the second profiled side piece at the second bearing end for the joint supporting of an elastomer bearing.

According to another aspect the invention concerns a method for making a multipiece spring link, such as the multipiece spring link according to the first mentioned aspect, with: extruding of two light metal extruded profiles, and bending, especially press bending, of the light metal extruded profiles in a middle region of the light metal extruded profiles, in order to obtain a profiled side piece with a bulge, wherein opposing bulges of profiled side pieces form a spring receiving region for the supporting of a spring.

Thus, the base body of the spring link can be formed from two light metal extruded profiles. The profiled side pieces are extruded, for example, with similar Z-shaped cross section. The extruded semifabricated piece is then placed in a press for bending. In the middle region, where a spring support is to be arranged, an arc is formed in each case in order to obtain the bulges. The fastening holes for bearing seats can then be punched in the respective side wall.

According to one embodiment, the method comprises the pressing of a light metal part in order to obtain a spring support part, and the intimate fastening of the spring support part to the profiled side pieces, especially on facing inner flanges of the profiled side pieces, in the spring receiving region.

Due to the base body of two separate extruded profiles and spring support, a high material utilization is achieved. As compared to the traditional shell profile little material is punched out, especially for a Z-profile.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

BRIEF DESCRIPTION OF THE DRAWINGS

Further sample embodiments shall be described making reference to the enclosed figures, wherein:

FIG. 3 shows a representation of the multipiece spring link 100;

FIGS. 5A, 5B and 5C show representations of a multipiece spring link 100;

FIGS. 6A, 6B and 6C show representations of a multipiece spring link 100.

It is to be understood that both the foregoing general description and the following detailed description are exemplary and explanatory only, and are intended to provide an explanation of various embodiments of the present teachings.

DETAILED DESCRIPTION

Figure 1A:
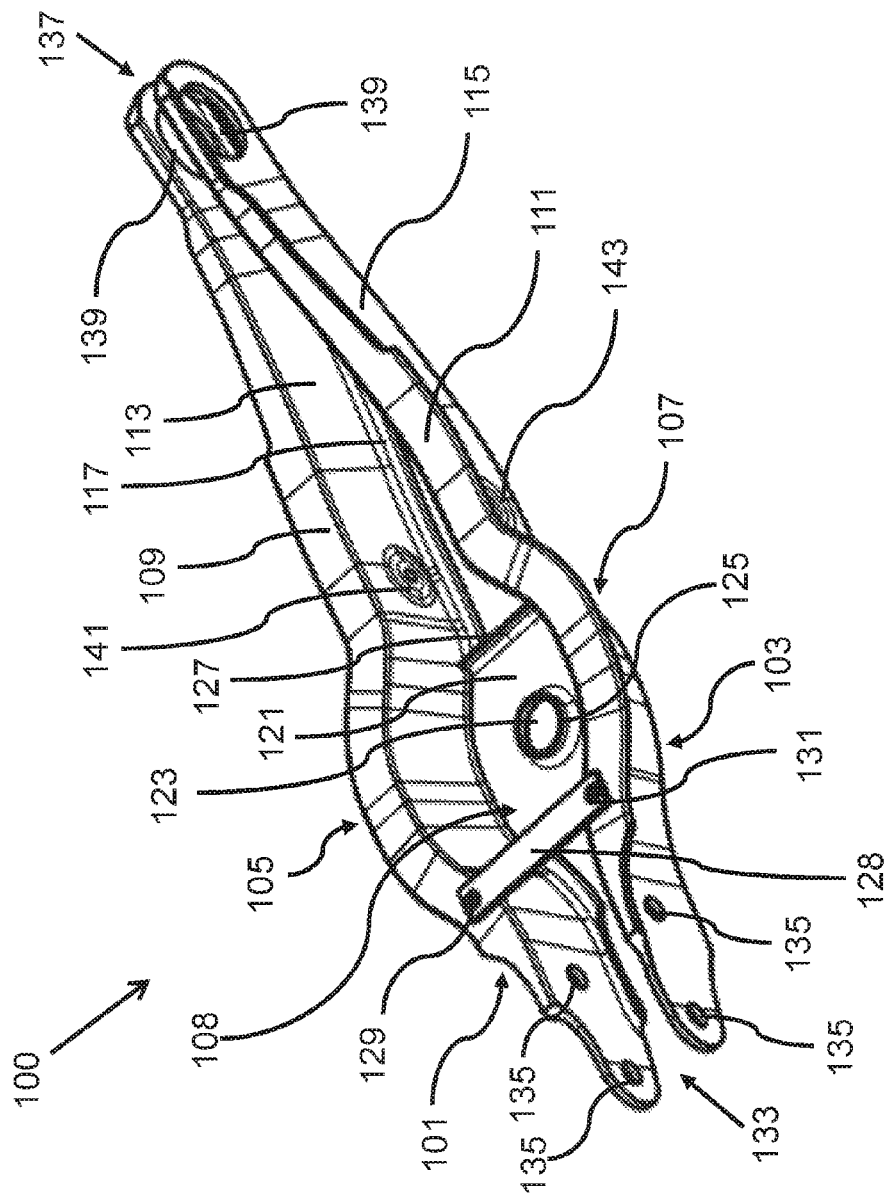
FIGS. 1A and 1B show representations of a multipiece spring link 100.
Figure 1B:
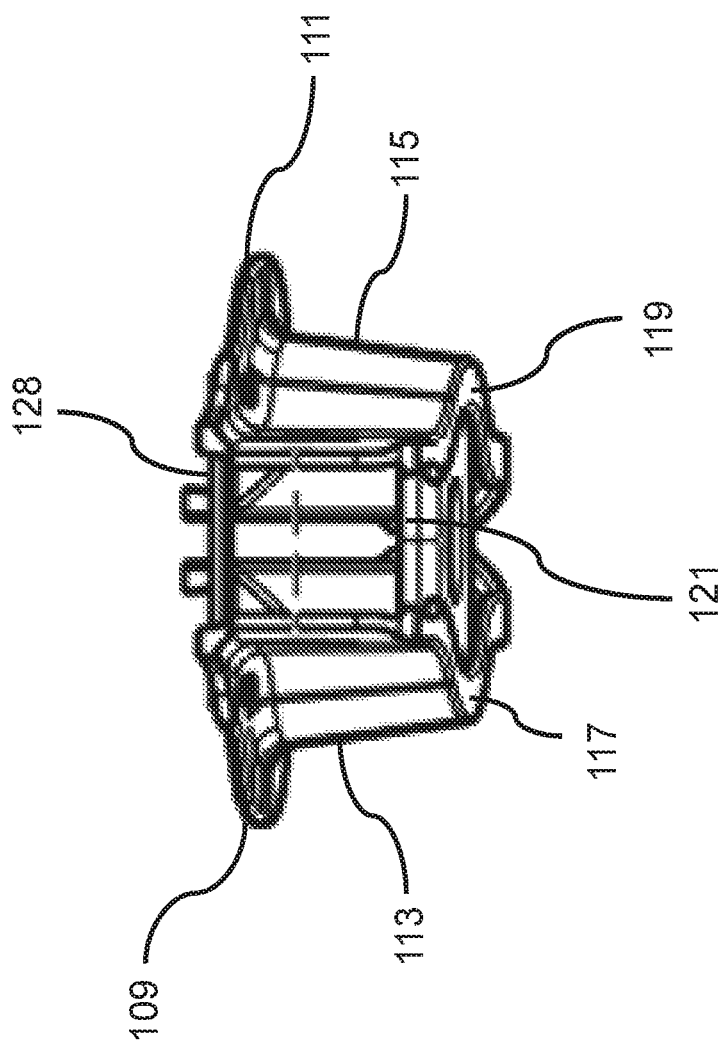

FIGS. 1A and 1B show representations of a multipiece spring 100 for the wheel suspension of a vehicle, with a first profiled side piece 101, which forms a first side leg of the multipiece spring link 100, and with a second profiled side piece 103, which forms a second side leg of the multipiece spring link 100.

The profiled side pieces 101 and 103 form a base body of the spring link 100.

The first profiled side piece 101 has a first bulge 105, which is shaped for example by a bending of the first profiled side piece 101. Accordingly, the second profiled side piece 103 has a second bulge 107, which is likewise shaped by a bending of the second profiled side piece 103. The bulges 105 and 107 are disposed opposite each other and jointly form a spring receiving region 108 for the supporting of a spring, not shown in FIG. 1.

The first profiled side piece 101 and the second profiled side piece 103 are disposed opposite each other and each have, for example, an elongated Z cross section profile. The upper webs of the mirror image Z cross section profiles each form an outer flange 109 of the first profiled side piece 101 and an outer flange 111 of the second profiled side piece 103. The outer flanges 109 and 111 are facing away from each other and oriented outward.

The outer flanges 109 and 111 are each joined by a wall 113, 115 to a lower Z-web, which for the first profiled side piece 101 forms a first inner flange 117 and for the second profiled side piece 103 a second inner flange 119. The Inner flanges 117 and 119 are inwardly directed and face each other.

The Inner flanges 117 and 119 are preferably arranged in the same plane and form supports to receive a spring support part 121.

The spring support part 121 is, for example, a molded part fabricated from a light metal like aluminum.

According to one embodiment, the spring support part 121 comprises a central opening 123, which is bordered by a centering web 125. The centering web 125 is provided for a centering of a spring being supported by the spring support part 121. The spring support part 121 moreover can have at least one limiting web 127 at the edge, which is shaped for example by a bending of the spring support part 121. The limiting web 127 can prevent a slippage of the spring.

The spring support part 121 rests on the inner flanges 117 and 119 and is intimately joined to them, for example, by a material connection.

The spring link 100 moreover can have a reinforcing web 128, which connects the first profiled side piece 101 and the second profiled side piece 103. The reinforcing web 128 for example rests on the outer flanges 109, 111, for example immediately in front of the spring receiving region 108. The reinforcing web 128 can additionally prevent a widening of the spring link 100 in the spring receiving region 108, so that even greater rigidity of the spring link 100 is achieved.

The reinforcing web 127 can be joined to the outer flanges 109, 111, for example by connections 129, 131. The connections 129, 131 can be cold joining connections such as cinch connections, punch rivet connections, glue connections or mixed forms of these connections, such as clinch and glue connection. One advantage of cold joining techniques is that the material is not subjected to any thermal action, so that heat-induced material corrosion can be entirely avoided and an additional surface protection coating is not needed.

However, the connections 129, 131 can also be warm joining connections such as friction stir weldings. Friction stir welding is carried out below a melting temperature of the material and has the advantage of a smaller zone of thermal influence. In this way, one can avoid detrimental structural changes in the joint upon solidification of the melt.

The spring link 100 is fastened or can be fastened by its first bearing end 133 at the wheel side. For this, bearing openings 135 can be formed for the damper connection in the profiled side pieces 101, 103, such as punched holes.

The spring link 100 also has a second bearing end 137, which serves for the fastening of the spring link at the vehicle chassis side, for example, to a vehicle frame. For this, bearing openings 139 are formed in the profiled side pieces 101, 103, which serve for the joint holding of an elastomer bearing, such as a rubber bearing.

The profiled side pieces 101 and 103 can moreover have stabilizer connections 141 and 143.

The connection to a damper and/or a stabilizer makes it possible to stabilize the base body made from the two profiled side pieces, such as extruded profiles, against profile widening.

Figure 2A:
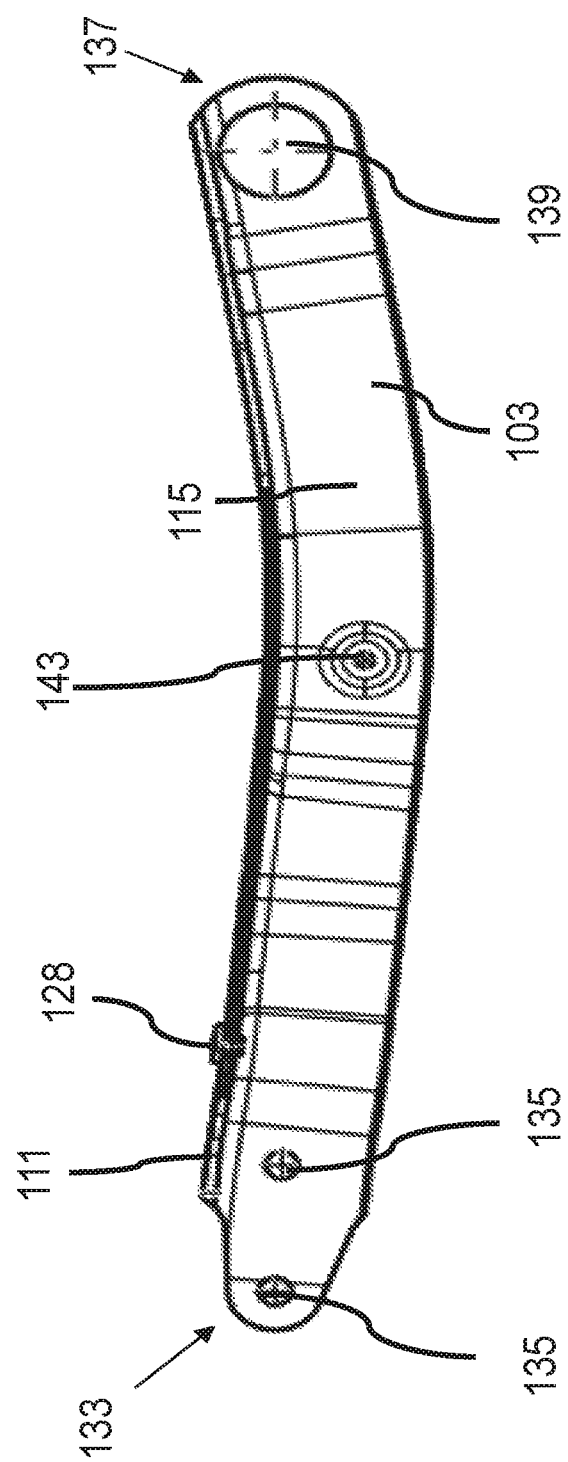
FIGS. 2A and 2B show representations of the multipiece spring link 100.
Figure 2B:
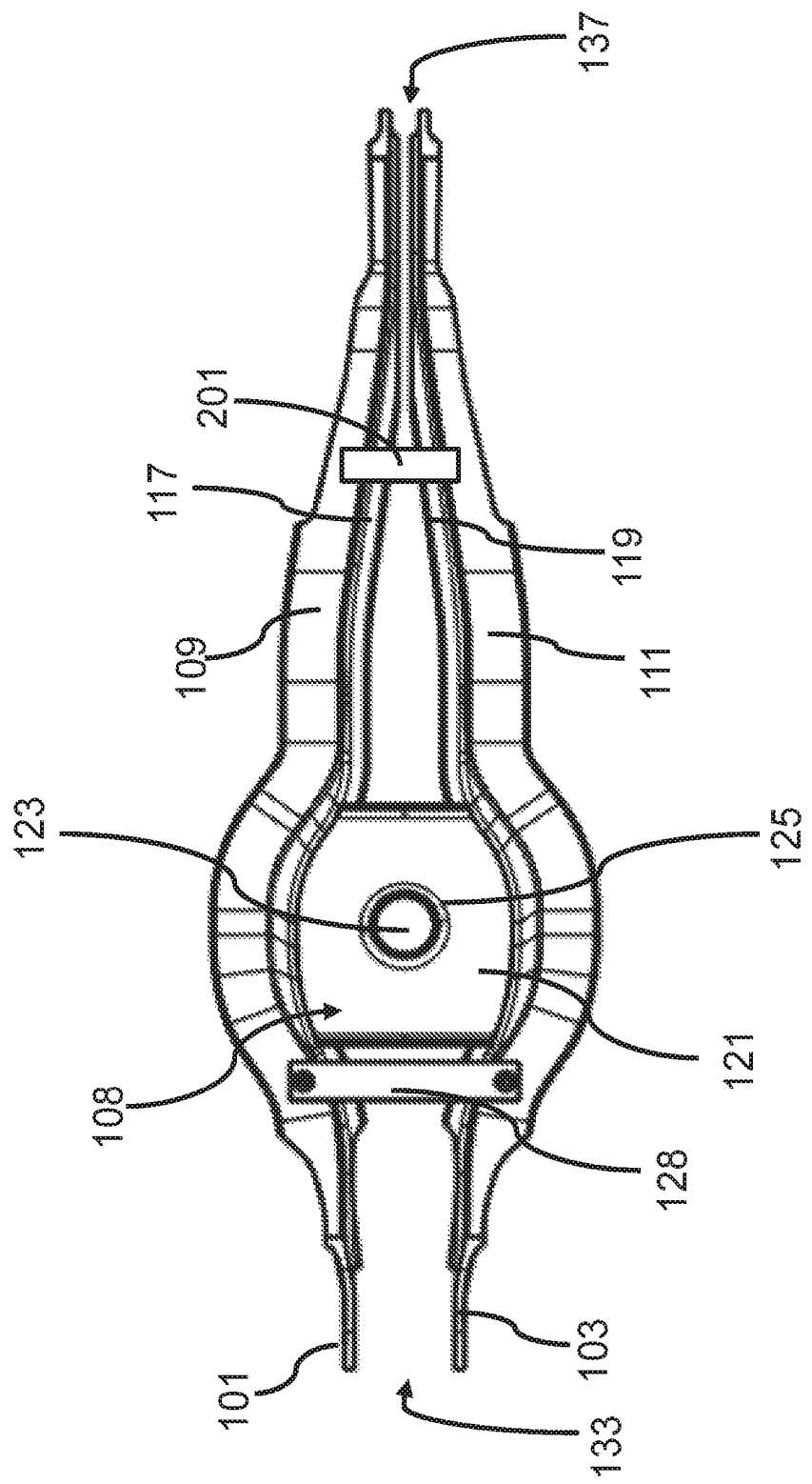

FIGS. 2A and 2B show further representations of the spring link 100.

As shown in FIG. 2A, the spring link 100 can be bent in the longitudinal direction. This lengthwise bending can be accomplished by a molding of the profiled side pieces 101 and 103.

FIG. 2B shows another representation of the spring link 100. As shown in FIG. 2B, the profiled side pieces 101 and 103 can run together in the direction of the second bearing end 137. By bringing the profiled side pieces 101 and 103 together, the bearing openings 139 are close together and jointly form a bearing support for an elastomer bearing, not shown in FIG. 2B.

The spring link optionally has another reinforcing web 201, which lies behind the spring receiving region 108, as seen from the first bearing end 133.

The additional reinforcing web 201 rests on the outer flanges 109, 111 and joins the profiled side pieces 101 and 103. In this way, even greater rigidity of the spring link 100 and greater stability of driving performance can be achieved. The further reinforcing web 201 can be connected to the outer flanges 109, 111 by means of a cold joining technique or a warm joining technique, as described in connection with the reinforcing web 128.

FIG. 3 shows a schematic representation of the spring link 100, in which a connection 129 of the reinforcing web 128 to the outer flanges 109, 111 and a connection 301 of the spring support part 121 to the inner flanges 113, 121 is shown. The connections 129 and 301 can be cold joining connections or warm joining connections, as were described in connection with the reinforcing web 128.

The spring support part 121 can be connected to the inner flanges 113, 121 by means of a cold joining technique or a warm joining technique, as was described in connection with the reinforcing web 128.

The outer flanges 109 and 111 have a profile thickness of 6 mm, for example. The walls 113 and 115 have a profile thickness of 3 mm, for example. The inner flanges 117, 119 have a profile thickness of 5 mm, for example.

Figure 4:
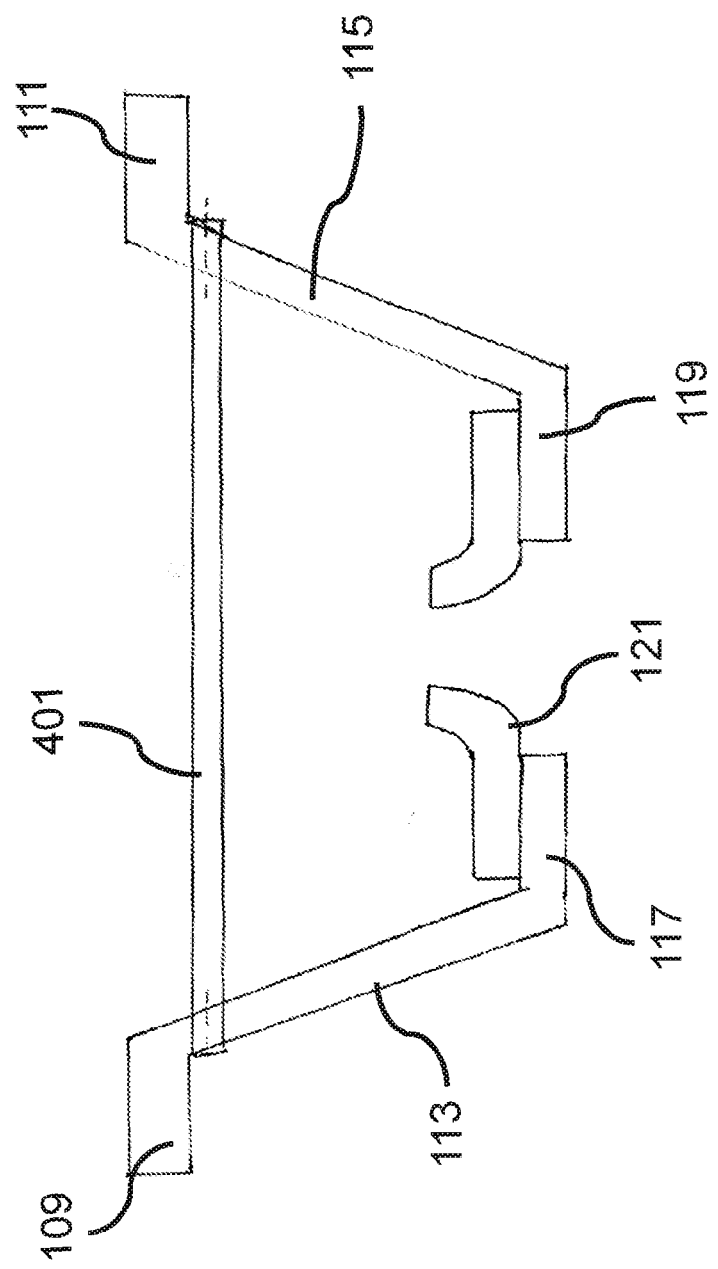
FIG. 4 shows a representation of the multipiece spring link 100.

According to one embodiment, the spring support part 121 can be fastened or arranged higher than is shown in FIG. 4. For this, the inner flanges 117, 119 can be shifted for example in the vertical direction and thus be formed or disposed higher on the walls 113 and 115. The inner flanges 117 and 119, however, can also be shifted upward in the vertical direction by a molding or remolding of the profiled side pieces 101, 103, especially the walls 113, 115. Furthermore, an intermediate bottom can be provided, which can be fastened on the inner flanges 117 and 119.

FIG. 4 shows another schematic representation of the spring link 100 with another reinforcing web 401, which passes through the walls 113, 115 beneath the outer flanges 109, 111. For this, the walls 113, 115 can have punched openings, in which the additional reinforcing web 401 can be inserted. The additional reinforcing web 401 can be joined to the walls 113, 115 by means of the same connection method as the connection web 128. In this way, an even greater stability of the spring link 100 can be achieved.

The additional reinforcing web 401 can be provided in addition or alternatively to one of the reinforcing webs 128, 201 or to the two reinforcing webs 128, 201.

Figure 5A:
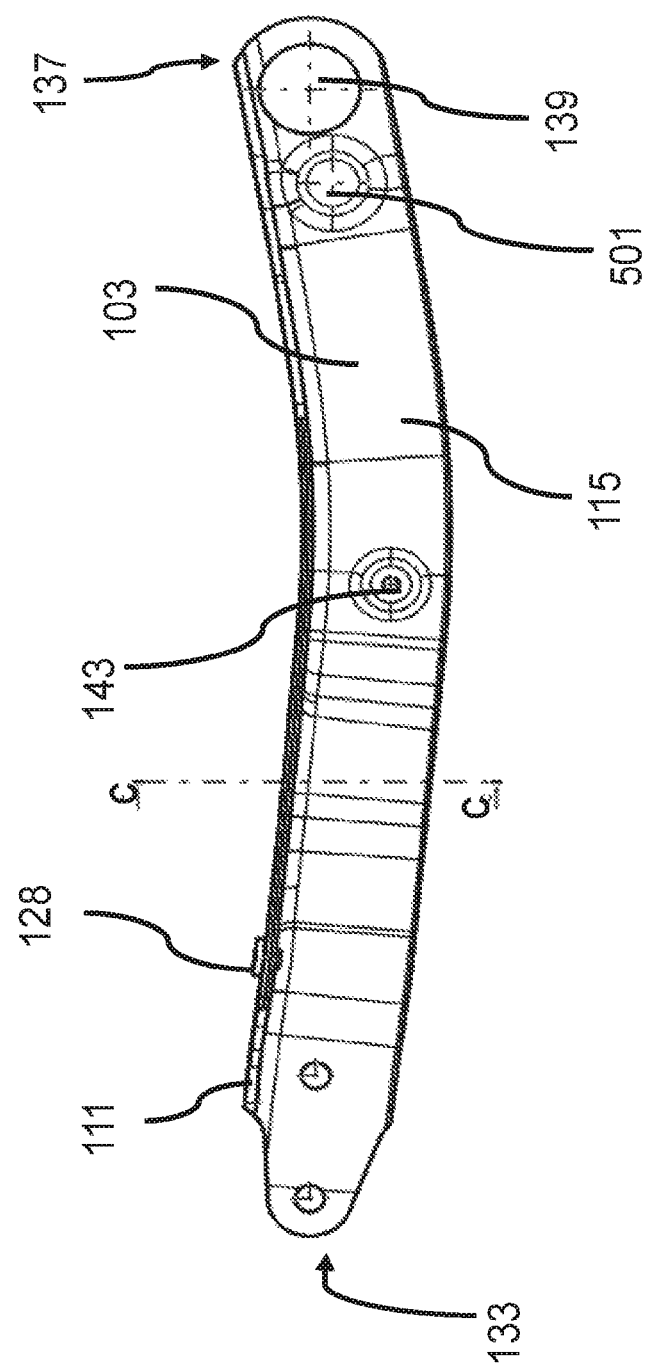
Figure 5C:
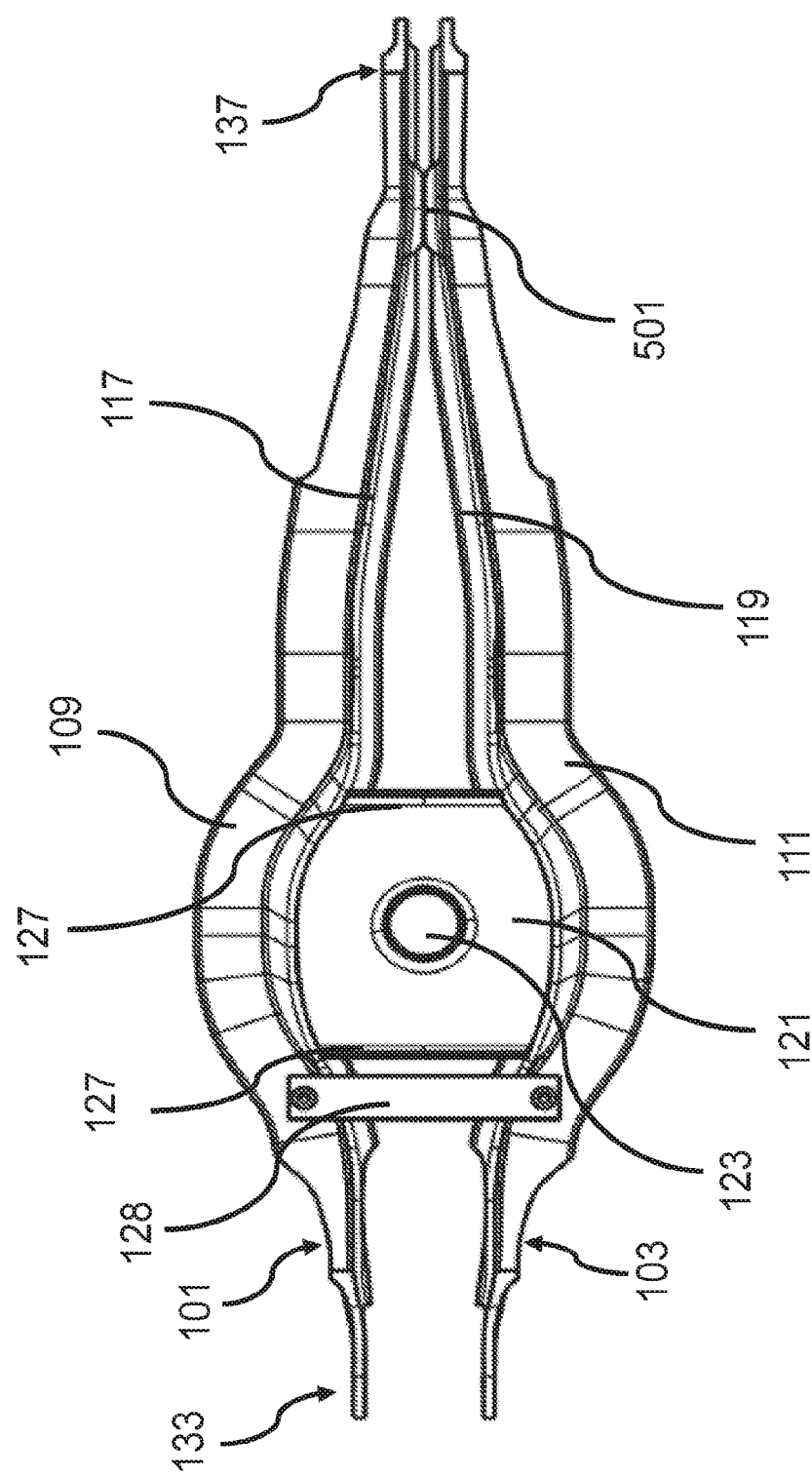

FIG. 5A, FIG. 5B and FIG. 5C show further representations of the spring link 100. In contrast to the representations shown in FIG. 1A and FIG. 1B, the profiled side pieces 101 and 103 are joined together by a connection 501 in the region of the second bearing end 137. In this way, the profiled side pieces 101 and 103 are held together at the bearing end side, in order to achieve a greater stability of the mounting of the elastomer bearing in the bearing openings and an improved driving behavior of the spring link 139. The connection 501 can be a clinch connection or a punch rivet connection.

The connection 501 can be provided as an alternative to the reinforcing web 128, 201, 401. According to one embodiment, the connection 501 can be combined with at least one of the reinforcing webs 128, 201, 401.

FIG. 5B shows a cross section of the spring link 100 along axis C-C.

Figure 6A:
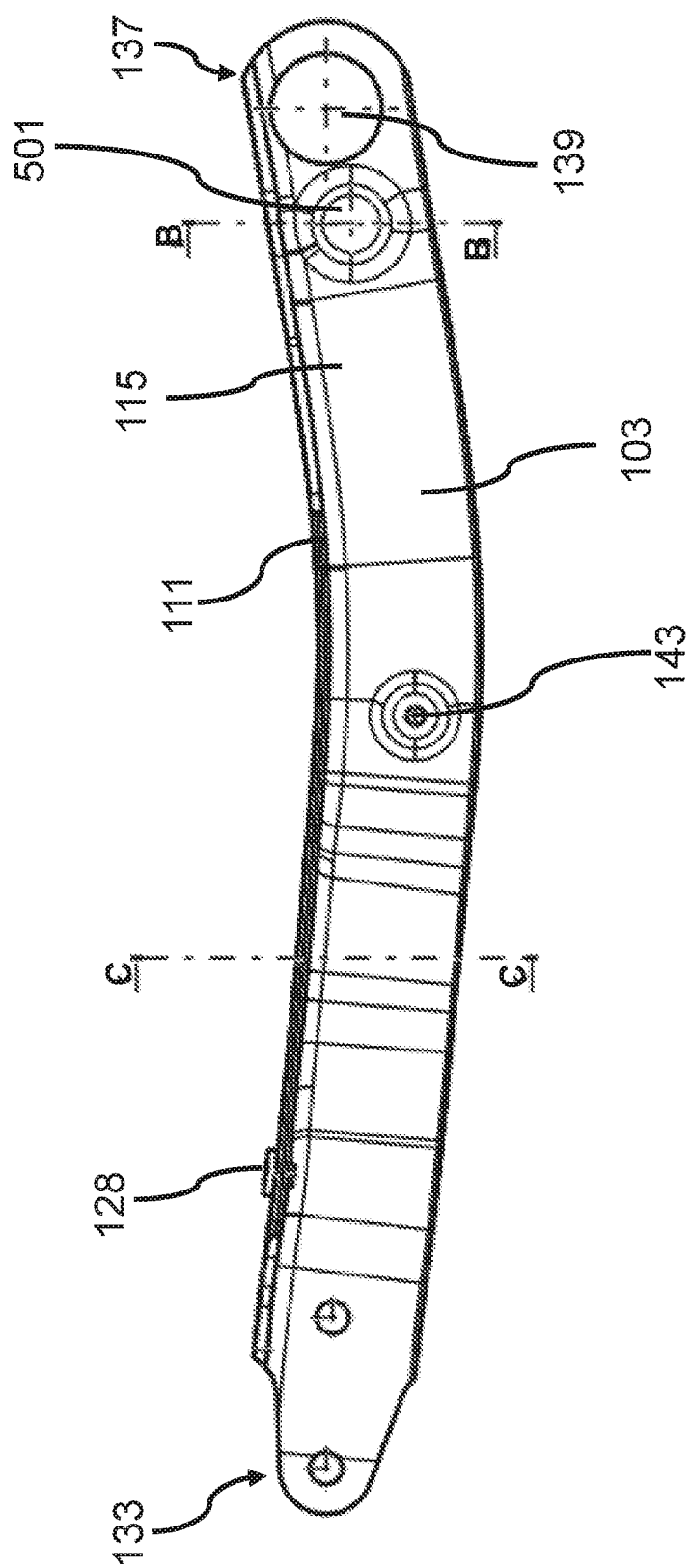
Figure 6C:
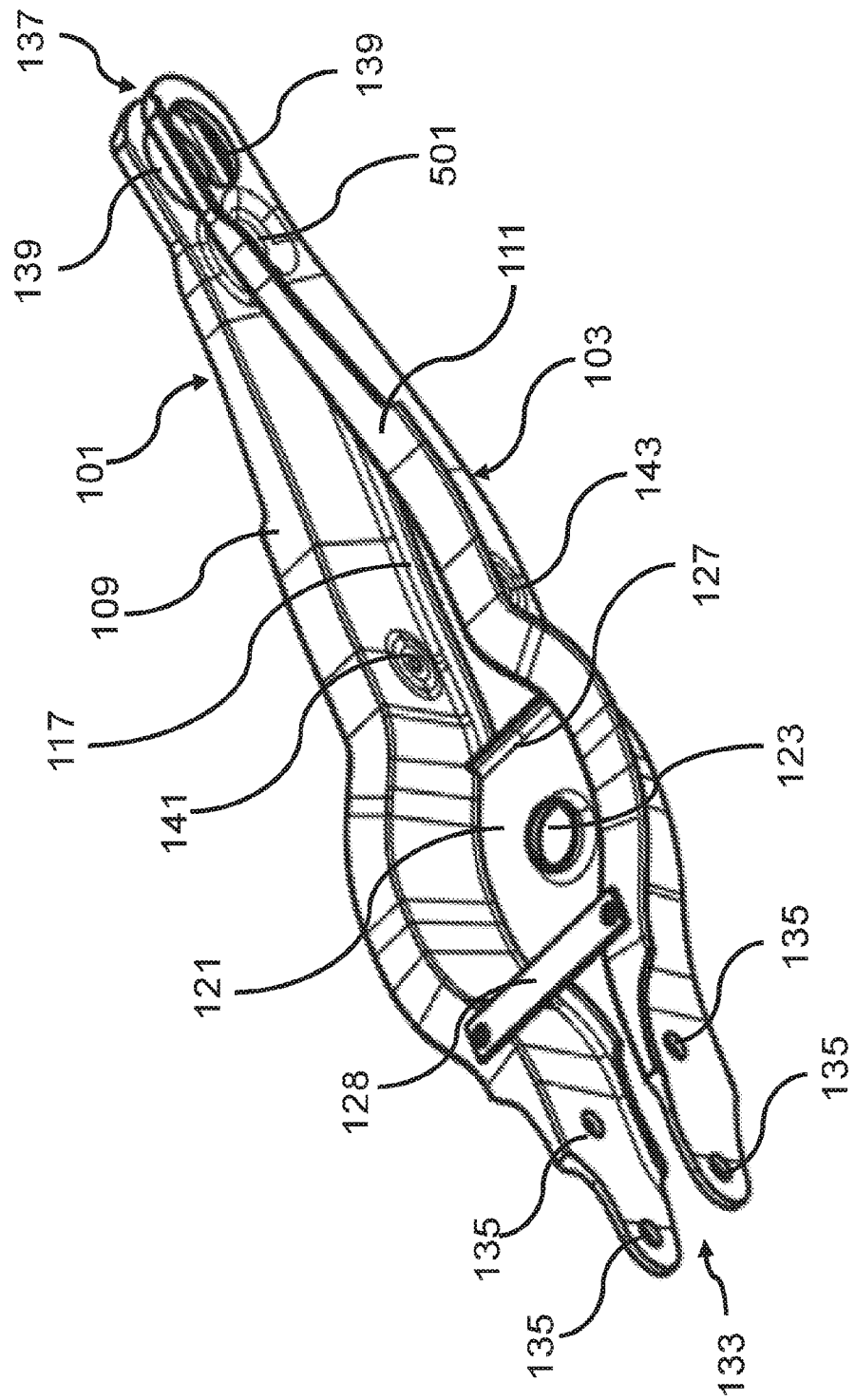

FIG. 6A, FIG. 6B and FIG. 6C show further representations of the spring link 100 shown in FIGS. 5A, 5B and 5C. FIG. 6B shows a cross section of the spring link 100 along the axis D-D. In this representation, the coming together of the profiled side pieces 101 and 103 in the region of the connection 501 is shown in particular. Due to the connection 501, the walls 113, 115 of the profiled side pieces 101 and 103 are brought together for a section, so that the spring link 100 has an X-shaped profile in the region of the connection 501.

Figure 7:
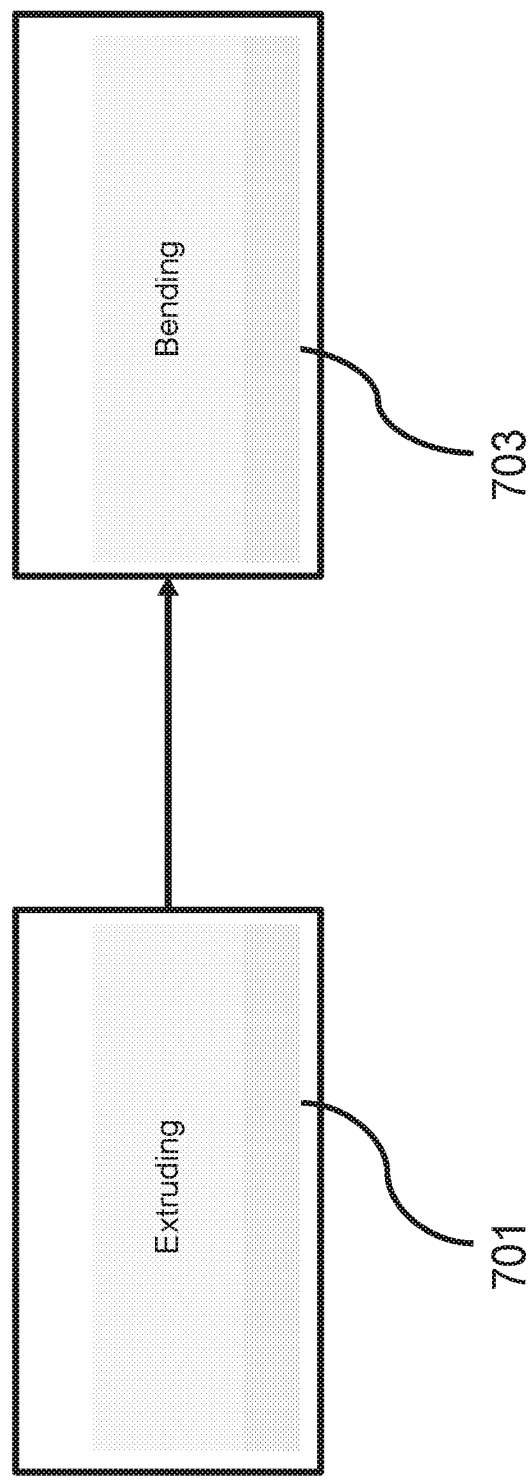
FIG. 7 shows a flow chart of a method for making a multipiece spring link.

FIG. 7 shows a schematic diagram of a method for making a multipiece spring link, such as the spring link 100, with: extruding 701 of two light metal extruded profiles, and bending 703, especially press bending, of the light metal extruded profiles in a middle region of the light metal extruded profiles, in order to obtain a profiled side piece with a bulge, wherein opposing bulges of profiled side pieces form a spring receiving region for the supporting of a spring.

LIST OF REFERENCE SYMBOLS

100 Spring link
101 Profiled side piece
103 Profiled side piece
105 Bulge
107 Bulge
108 Spring receiving region
109 Outer flange
111 Outer flange
113 Wall
115 Wall
117 Inner flange
119 Inner flange
121 Spring support part
123 Opening
125 Centering web
127 Limiting web
128 Reinforcing web
129 Connection
131 Connection
133 First bearing end
135 Bearing openings
137 Second bearing end
139 Bearing openings
141 Stabilizer connection
143 Stabilizer connection
201 Reinforcing web
301 Connections
401 Reinforcing web
501 Connection
701 Extruding
703 Bending From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

The invention claimed is:

1. A multipiece spring link for a wheel suspension of a vehicle, comprising:
   a first profiled side piece, forming a first side leg of the multipiece spring link, wherein the first profiled side piece has a first bulge;
   a second profiled side piece, forming a second side leg of the multipiece spring link, wherein the second profiled side piece has a second bulge; and
   a reinforcing web, which passes through a wall of the first profiled side piece and a wall of the second profiled side piece and joins the first profiled side piece and the second profiled side piece;
   wherein each of the first profiled side piece and the second profiled side piece are formed of a light metal,
   wherein the first bulge and the second bulge are arranged one opposite the other and together form a spring receiving region for the receiving of a spring,
   wherein the first profiled side piece and the second profiled side piece are each single-piece profiled side pieces, and
   wherein each of the first profiled side piece and the second profiled side piece is an extruded profiled side piece.

2. The multipiece spring link according to claim 1, wherein the first profiled side piece and the second profiled side piece are spaced apart from each other at least for a section and arranged opposite each other.

3. The multipiece spring link according to claim 1, wherein the first profiled side piece and the second profiled side piece each have at least one of a Z shaped cross section and an S shaped cross section.

4. The multipiece spring link according to claim 1, wherein the first profiled side piece and the second profiled side piece each have an outer flange and an inner flange, wherein in each case one outer flange and one inner flange of the respective profiled side piece is joined by a wall, wherein the outer flanges of the profiled side pieces are oriented outward facing away from each other and wherein the inner flanges of the profiled side pieces are oriented inward facing each other.

5. The multipiece spring link according to claim 4, wherein the profile thicknesses of the outer flanges differ from the profile thicknesses of the inner flanges and/or from the profile thicknesses of the walls.

6. The multipiece spring link according to claim 1, wherein the first profiled side piece and the second profiled side piece each have an inner flange, wherein the inner flanges of the profiled side pieces are directed inward and facing each other, while in the spring receiving region a spring support part is arranged on the inner flanges for supporting the spring.

7. The multipiece spring link according to claim 6, wherein the spring support part is formed by a molded part, especially by a light metal pressed part.

8. The multipiece spring link according to claim 6, wherein the spring support part is joined to the respective inner flange by at least one of a cold joining technique and a warm joining technique.

9. The multipiece spring link according to claim 1, wherein the first profiled side piece and the second profiled side piece each have an outer flange outwardly directed and facing away from each other, and wherein the multipiece spring link further comprises a reinforcing web that is arranged on the outer flanges and configured to join the first profiled side piece and the second profiled side piece.

10. The multipiece spring link according to claim 9, wherein the reinforcing web is joined to the respective outer flange by at least one of a cold joining technique and a warm joining technique.

11. The multipiece spring link according to claim 9, wherein the respective reinforcing web is arranged at, at least one of the wheel suspension side, immediate to the spring receiving region and at the vehicle chassis side.

12. The multipiece spring link according to claim 1, wherein the multipiece spring link has a first bearing end for mounting at the wheel side and a second bearing end for mounting at the vehicle chassis side, wherein at least one of (i) the first profiled side piece and the second profiled side piece have aligned opposing bearing openings at the first bearing end for the damper connection, and (ii) the first profiled side piece and in the second profiled side piece aligned opposing bearing openings are formed at the second bearing end for the joint mounting of an elastomer bearing.

13. The multipiece spring link according to claim 3, wherein the Z-shaped cross section is an elongated Z-shaped cross section and the S-shaped cross section is an elongated S-shaped cross section.

14. The multipiece spring link according to claim 8, wherein the cold joining technique is at least one of a clinch connection, a punch rivet connection, and an adhesive connection, and wherein the warm joining technique is a friction stir welding.

15. The multipiece spring link according to claim 10, wherein the cold joining technique is at least one of a clinch connection, a punch rivet connection, and an adhesive connection, and wherein the warm joining technique is a friction stir welding.

16. A multipiece spring link for a wheel suspension of a vehicle, comprising:
- a first profiled side piece, forming a first side leg of the multipiece spring link, wherein the first profiled side piece has a first bulge;
- a second profiled side piece, forming a second side leg of the multipiece spring link, wherein the second profiled side piece has a second bulge;
- a reinforcing web, which passes through a wall of the first profiled side piece and a wall of the second profiled side piece and joins the first profiled side piece and the second profiled side piece;
- wherein the first bulge and the second bulge are arranged one opposite the other and together form a spring receiving region for the receiving of a spring.

* * * * *